(12) United States Patent
Grubisic et al.

(10) Patent No.: US 10,055,151 B2
(45) Date of Patent: Aug. 21, 2018

(54) IDENTIFYING INFORMATION IN AN ARRAY OF DATA STORAGE ELEMENTS ARRANGED AS MULTIPLE PARTITIONS USING PARTITION IDENTIFIERS

(71) Applicant: ARM LIMITED, Cambridge (GB)

(72) Inventors: Roko Grubisic, Fulbourn (GB); Häkan Lars-Göran Persson, Bjärred (SE); Georgia Kouveli, Fulbourn (GB)

(73) Assignee: ARM Limited, Cambridge (GB)

( * ) Notice: Subject to any disclaimer, the term of this patent is extended or adjusted under 35 U.S.C. 154(b) by 24 days.

(21) Appl. No.: 15/256,942

(22) Filed: Sep. 6, 2016

(65) Prior Publication Data

US 2017/0090791 A1    Mar. 30, 2017

(30) Foreign Application Priority Data

Sep. 28, 2015  (GR) .............................. 20150100422
Jan. 29, 2016  (GB) ................................. 1601655.2

(51) Int. Cl.
*G06F 12/08*     (2016.01)
*G06F 3/06*      (2006.01)
(Continued)

(52) U.S. Cl.
CPC .......... *G06F 3/0619* (2013.01); *G06F 3/0644* (2013.01); *G06F 3/0665* (2013.01);
(Continued)

(58) Field of Classification Search
CPC ............. G06F 12/0864; G06F 12/0871; G06F 2212/6032; G06F 2212/1024; G06F 2212/312; G06F 3/067
See application file for complete search history.

(56) References Cited

U.S. PATENT DOCUMENTS 5,717,916 A * 2/1998 Verma ................... G06F 12/123
5,933,860 A    8/1999 Emer et al.
(Continued)

FOREIGN PATENT DOCUMENTS

WO    02/073415    9/2002

OTHER PUBLICATIONS

Greek Search Report dated Sep. 14, 2016 in GR 20150100422 and English translation, 4 pages.
(Continued)

*Primary Examiner* — Hiep Nguyen
(74) *Attorney, Agent, or Firm* — Nixon & Vanderhye P.C.

(57) ABSTRACT

A data storage device comprises an array of data storage elements arranged as multiple partitions each comprising two or more data storage elements, each data storage element being associated with a respective identifier which identifies a data item currently stored by that data storage element; a predictor configured to compare, for each partition, information derived from the identifiers associated with the data storage elements of that partition with information derived from an identifier associated with the required data item, to identify a subset of partitions that do not store the required data item; and a comparator configured to compare identifiers associated with data storage elements of one or more partitions with the identifier associated with the required data item, wherein any partitions in the subset of partitions are excluded from the test group of partitions.

11 Claims, 5 Drawing Sheets

(51) Int. Cl.
*G06F 12/1018* (2016.01)
*G06F 12/0864* (2016.01)
*G06F 12/0895* (2016.01)
*G06F 12/0804* (2016.01)
*G06F 12/0866* (2016.01)

(52) U.S. Cl.
CPC ........ *G06F 3/0689* (2013.01); *G06F 12/0864* (2013.01); *G06F 12/0895* (2013.01); *G06F 12/1018* (2013.01); *G06F 12/0804* (2013.01); *G06F 12/0866* (2013.01); *Y02D 10/13* (2018.01)

(56) References Cited

U.S. PATENT DOCUMENTS

| | | | |
|---|---|---|---|
| 6,016,533 A | | 1/2000 | Tran |
| 6,269,425 B1 * | | 7/2001 | Mounes-Toussi .. G06F 12/0842 711/122 |
| 2008/0209133 A1 * | | 8/2008 | Ozer ................. G06F 12/0822 711/146 |
| 2009/0031082 A1 | | 1/2009 | Ford et al. |
| 2014/0143492 A1 | | 5/2014 | Eckert et al. |
| 2014/0181405 A1 | | 6/2014 | Sassone et al. |
| 2014/0181407 A1 | | 6/2014 | Crum et al. |

OTHER PUBLICATIONS

Combined Search and Examination Report for GB1601655.2 dated Jul. 8, 2016, 6 pages.
H. Park et al., "A Novel Tag Access Scheme for Low Power L2 Cache", *Design, Automation & Test in Europe*, Mar. 14-18, 2011, IEEE, pp. 1-6.
C. Zhang et al., "A Way-Halting Cache for Low-Energy High-Performance Systems", *International Symposium on Low Power Electronics and Design*, Aug. 9-11, 2004, IEEE, pp. 126-131.
R.E. Kessler et al., "Inexpensive Implementations of Set-Associativity", *The 16th Annual International Symposium on Computer Architecture*, Jun. 1989, IEEE, pp. 131-139.
[Online], Wikipedia—Bloom Filter, https://en.wikipedia.org/wiki/Bloom_filter; printed Jul. 24, 2015, 12 pages.

* cited by examiner

IDENTIFYING INFORMATION IN AN ARRAY OF DATA STORAGE ELEMENTS ARRANGED AS MULTIPLE PARTITIONS USING PARTITION IDENTIFIERS

This application claims priority to GR Patent Application No. 20150100422 filed Sep. 28, 2015 and GB Patent Application No. 1601655.2 filed Jan. 29, 2016, the entire contents of each of which are hereby incorporated by reference.

BACKGROUND

This disclosure relates to data storage, for example (though not exclusively) in the context of cache memories.

Fully associative cache memories are typically implemented with a so-called tag array which holds tags, the tags being examples of identifiers associated with lines or partitions of the cache memory which are indicative of the data stored in those partitions. A bank of comparators, one for each cache line or partition, compares the stored tags with information derived from a request for access to the cache memory. A data array holds actual cache lines (the data).

In order to be able to read all the stored tags in every clock cycle that has a valid request, the tags are typically held in flip-flops to allow simultaneous comparisons of the tag corresponding to a current request with multiple sets of tags. In a fully associative arrangement, all tag bits for all tags have to be compared, so the number of flip-flops increases with the tag size. Possible disadvantages of this type of fully associative caches include the on-chip flip-flop area required for tag storage, the power of doing full tag comparisons every active clock cycle (for example, when accesses do not exhibit good spatial locality) and the timing of the comparison logic that is likely to be in a critical path.

On the other hand, set-associative caches, where any particular data item is restricted to a set (that is to say, a subset) of available locations, allow the tag array to be stored in memory such as SRAM (static random access memory) where a limited number of tags are read out in any one clock cycle, and only need a limited number of comparators. They are therefore likely to be more power and area efficient at each access or lookup, but they are limited by their cache placement policy and cannot necessarily be used for applications that really require a fully associative cache. These would be applications where an ability to store a data item to any available location of a cache regardless of the value of the tags is mandatory (the set-associative organization might be a problem for special-purpose caches where tags are not addresses) or certain associative buffers where there might be a requirement to hold a number of recent items and a need to perform random lookups.

It is a constant aim to improve the efficiency and/or flexibility of data storage.

SUMMARY

In an example arrangement there is provided a data storage device comprising:

an array of data storage elements arranged as multiple partitions each comprising two or more data storage elements, each data storage element being associated with a respective identifier which identifies a data item currently stored by that data storage element;

a predictor configured to compare, for each partition, information derived from the identifiers associated with the data storage elements of that partition with information derived from an identifier associated with the required data item, to identify a subset of partitions that do not store the required data item; and a comparator configured to compare identifiers associated with data storage elements of one or more partitions in a test group of partitions with the identifier associated with the required data item, wherein any partitions in the subset of partitions are excluded from the test group of partitions.

In another example arrangement there is provided a data storage device comprising:

means for storing data as an array of data storage elements arranged as multiple partitions each comprising two or more data storage elements, each data storage element being associated with a respective identifier which identifies a data item currently stored by that data storage element;

means for comparing, for each partition, information derived from the identifiers associated with the data storage elements of that partition with information derived from an identifier associated with the required data item, to identify a subset of partitions that do not store the required data item; and means for comparing identifiers associated with data storage elements of one or more partitions in a test group of partitions with the identifier associated with the required data item, wherein any partitions in the subset of partitions are excluded from the test group of partitions.

In another example arrangement there is provided a data storage method comprising:

storing data as an array of data storage elements arranged as multiple partitions each comprising two or more data storage elements, each data storage element being associated with a respective identifier which identifies a data item currently stored by that data storage element;

comparing, for each partition, information derived from the identifiers associated with the data storage elements of that partition with information derived from an identifier associated with the required data item, to identify a subset of partitions that do not store the required data item; and comparing identifiers associated with data storage elements of one or more partitions in a test group of partitions with the identifier associated with the required data item, wherein any partitions in the subset of partitions are excluded from the test group of partitions.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides a data storage device comprising:

an array of data storage elements arranged as multiple partitions each comprising two or more data storage elements, each data storage element being associated with a respective identifier which identifies a data item currently stored by that data storage element;

a predictor configured to compare, for each partition, information derived from the identifiers associated with the data storage elements of that partition with information derived from an identifier associated with the required data item, to identify a subset of partitions that do not store the required data item; and a comparator configured to compare identifiers associated with data storage elements of one or more partitions in a test group of partitions with the identifier associated with the required data item, wherein any partitions in the subset of partitions are excluded from the test group of partitions.

Example embodiments of the disclosure provide a data storage device with the advantages of a fully associative arrangement but also with an advantageous technique for detecting whether a required data item is stored by the data storage device. A predictor is used to detect one or more partitions which may be storing the required data item, based on a comparison with information derived (for example, hashed) from an identifier (such as a tag) associated with the required data item, and information associated with each partition (for example, information derived (for example, hashed) from the tags of data items stored by that partition). In examples, this can give an initial outcome which can indicate zero or more partitions as possible locations, and eliminate zero or more other partitions, or in other words, potentially reducing the number of partitions for which a tag comparison has to be made. This in turn can allow the tags or identifiers to be stored in a more convenient manner than in previously proposed data storage devices, for example in SRAM. In this way, some advantages of fully associative data storage devices (in terms of flexibility of storage location) can potentially be obtained, but with the potential advantage of the type of tag (identifier) comparison normally used in set-associative data storage devices.

In example embodiments the comparator is configured to compare identifiers associated with each of the test group of partitions in turn with the identifier associated with the required data item, until either all of the partitions' identifiers in the test group of partitions have been compared or a match has been detected between an identifier associated with a data storage element of one of the partitions in the test group of partitions and the identifier associated with the required data item. This can, for example, provide the potential advantage that because the identifier comparisons are carried out in turn, there is no requirement to store the identifiers in a simultaneously accessible form such as in flip-flops.

Example embodiments make use of hash values derived from the identifiers for the operation of the predictor, in that the predictor is configured to compare a partition hash value derived from the identifiers associated with the data storage elements of that partition with a hash value derived from an identifier associated with the required data item. In example embodiments the partition hash value derived from the identifiers associated with the data storage elements of a partition comprises a logical combination of respective hash values derived from each of the identifiers associated with the data storage elements of that partition. In example embodiments the predictor is configured to detect those bits of the hash value derived from the required data item which have a particular bit value and to detect a match when corresponding bit positions of the partition hash value derived from the identifiers associated with the data storage elements of a partition under test have that particular bit value; and the logical combination of the respective hash values is a combination such that when any bit position in any of the respective hash values has the particular bit value, that bit position of the partition hash value is assigned the particular bit value. These example arrangements can individually or collectively provide the advantage that a comparison by the predictor can potentially provide an outcome which indicates that a required data item is not stored in one subset of partitions, and that it may be stored in any of another subset of partitions.

For convenience of access, rather than generating the information whenever it is required, in example embodiments the predictor is configured to store the information derived from the identifiers associated with the data storage elements of each partition.

In example embodiments, the device comprises control logic, responsive to a change in the data items stored by the data storage elements of a partition (for example, a newly stored item and/or an eviction of an item), to generate replacement information derived from the identifiers associated with the data storage elements of that partition, for storage by the predictor. This can provide the advantage of the partition information being kept up to date (rather than, as could otherwise happen, saturating to the particular bit value), without the need for more complex solutions such as so-called counting filters.

Example embodiments are particularly suited to arrangements in which the data storage device is a cache memory; and the identifier associated with a data item is a tag, for example a tag derived from that data item's memory address. For example, the tag may comprise a portion of that data item's memory address. In example embodiments each data storage element comprises a group of data storage locations configured to store multiple data items having a most significant portion of their memory addresses in common; and the tag comprises at least a part of the most significant portion of the memory addresses.

In the situation that a cache miss is detected, example embodiments provide control logic configured to obtain a required data item from a main memory or other level of cache hierarchy and to store that data item in one of the data storage elements in response to a detection by the comparator that none of the identifiers associated with partitions detected by the predictor match the identifier associated with the required data item.

In example embodiments the array of data storage elements is fully associative such that any data item can be stored by any of the data storage elements. The arrangements discussed above can provide a convenient manner to detect where items may be stored in such an array.

Another example embodiment provides a data storage device comprising:

means for storing data as an array of data storage elements arranged as multiple partitions each comprising two or more data storage elements, each data storage element being associated with a respective identifier which identifies a data item currently stored by that data storage element;

means for comparing, for each partition, information derived from the identifiers associated with the data storage elements of that partition with information derived from an identifier associated with the required data item, to identify a subset of partitions that do not store the required data item; and means for comparing identifiers associated with data storage elements of one or more partitions in a test group of partitions with the identifier associated with the required data item, wherein any partitions in the subset of partitions are excluded from the test group of partitions.

Another example embodiment provides a data storage method comprising:

storing data as an array of data storage elements arranged as multiple partitions each comprising two or more data storage elements, each data storage element being associated with a respective identifier which identifies a data item currently stored by that data storage element;

comparing, for each partition, information derived from the identifiers associated with the data storage elements of that partition with information derived from an identifier associated with the required data item, to identify a subset of partitions that do not store the required data item; and comparing identifiers associated with data storage elements of one or more partitions in a test group of partitions with the identifier associated with the required data item, wherein any partitions in the subset of partitions are excluded from the test group of partitions.

Figure 1:
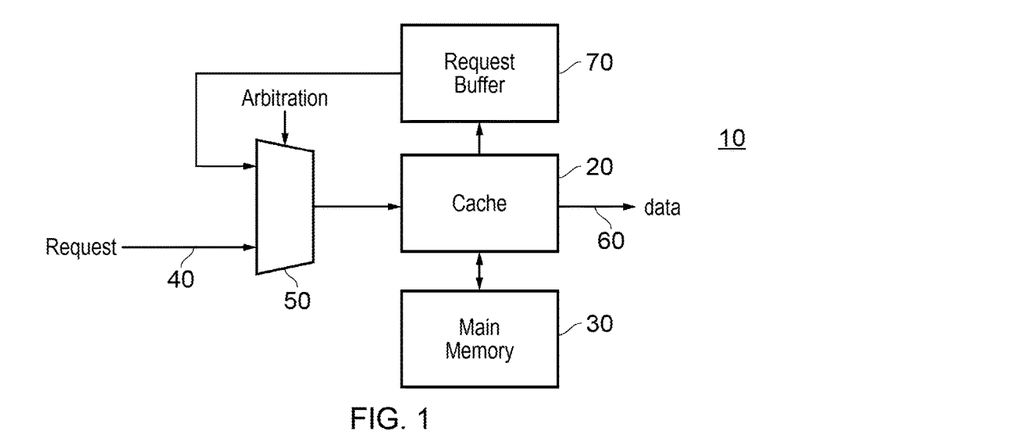
FIG. 1 schematically illustrates a data processing apparatus including a data storage device.

FIG. 1 schematically illustrates a data processing apparatus 10 including a data storage device 20, which in this example is a cache memory. The cache memory 20 stores a (relatively) quickly-accessible copy of some information held by a main memory or other level of cache hierarchy 30 (that is to say, a level of cache hierarchy different to that of the cache memory 20), so that in response to a request 40, a data processor such as a central processing unit (not shown in FIG. 1) can obtain a required data item from the cache memory 20 if it is held there. A successful access to the cache memory is referred to as a "hit"; and an unsuccessful access is referred to as a "miss".

In many examples, if a miss is detected then the cache memory 20 attempts to obtain the required data item from the main memory or other level of cache hierarchy 30 and stores it in the cache memory 20, evicting or displacing, if necessary, an already-stored data item.

Aspects of this process are shown in FIG. 1, in that a request 40 is received by a multiplexer 50, whose operation will be discussed further below, and passed to the cache memory 20. If a cache hit is detected, the required data item is returned as an output 60. If, however, a cache miss is detected, then the cache memory interacts with the main memory or other level of cache hierarchy 30 to retrieve the required data item and store it in the cache memory 20. Also, in at least some examples, the request associated with the miss is stored in a request buffer 70 to be resubmitted via the multiplexer 50 (under the control of appropriate arbitration to allow a mix of new requests and buffered (missed) requests to be handled) at a later time, for example once the item has been retrieved from the main memory or other level of cache hierarchy and stored in the cache memory.

The cache memory 20 in these examples is a fully associative data storage device, in that the cache memory 20 has an array of data storage elements arranged as multiple partitions each comprising two or more data storage elements. The array of data storage elements in the current example is fully associative such that any data item can be stored by any of the data storage elements.

An example of a data storage element is a so-called cache "line". A cache line stores a group of contiguous memory locations, such as a group having a common set of most significant bits of their address, such that the remaining least significant bits of the memory address can be used to select an individual item within the group.

In order to detect which data storage element is storing a currently required data item, an identifier such as a tag is derived, for example from the address of the required data item. In an example, the tag may comprise a portion of the data item's memory address. In some examples, each data storage element comprises a group of data storage locations configured to store multiple data items (such as a cache line as discussed above) having a most significant portion of their memory addresses in common, and the tag comprises (or is derived from) at least a part of that most significant portion of the memory addresses. The tag or identifier for a required data item is compared with stored information representing tags or identifiers associated with data items actually held by the cache memory 20. So each data storage element (for example a cache line) is associated with a respective identifier such as a tag which identifies a data item currently stored by that data storage element.

In example arrangements, the cache memory 20 is fully associative as discussed above (although this is just an example and set associative or other arrangements could be used), but the data storage elements are organised as sets or partitions each comprising two or more data storage elements. So, in keeping with the fully associative property, any data item can be stored in any data storage element, but for the purposes of reading information from the cache memory (and of detecting which data storage element is storing a required data item), the data storage elements are organised as partitions.

A predictor is used to detect which of the partitions may be currently storing a required data item. The predictor is configured to compare, for each partition, information derived from the identifiers associated with the data storage elements of that partition with information derived from an identifier associated with the required data item, to identify a subset of partitions that do not store the required data item.

In some examples, a so-called Bloom filter or similar arrangement is used to provide the functionality of the predictor. The operation of a Bloom filter will be discussed in more detail below. In general terms, a Bloom filter provides a technique or mechanism for testing whether a test value is part of a data set. A negative outcome is definitely correct, but false positive outcomes may occur. So, this type of technique can be used to indicate those partitions (that is to say, a subset of one or more partitions) that definitely do not hold a required data item, along with those partitions which may (or may not, if the outcome is a false positive) hold the required data item. A benefit of such an arrangement is that it can reduce, or even significantly reduce, the number of partitions for which a definitive check then needs to be made to detect whether a required data item is held in that partition. Such a definitive check can be made by a direct comparison of the identifier or tag associated with the required data item and the identifier or tag or each data storage element of the candidate partitions. But the Bloom filter technique can provide a quick and efficient way of narrowing down the search by eliminating from the search those partitions which definitely do not hold the required data item.

Figure 2:
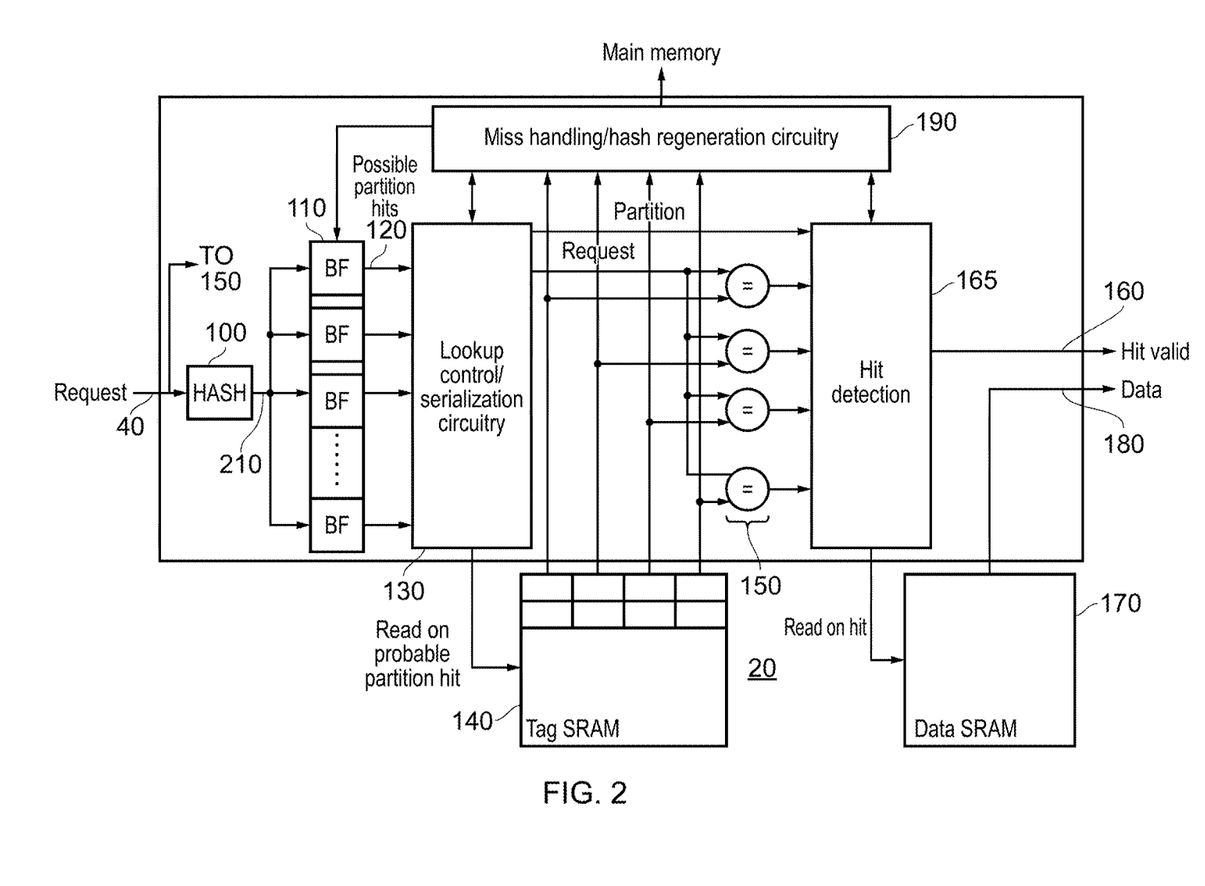
FIG. 2 schematically illustrates a cache memory device.

FIG. 2 schematically illustrates the cache memory device 20 in more detail, and its operation will be discussed with reference to FIGS. 3 to 10.

As mentioned above, the cache memory 20 is arranged as multiple partitions, each comprising two or more data storage elements such as cache lines. An incoming request 40 is provided to a hash generator 100 which generates a so-called hash value from the tag of the incoming request 40. Hash functions themselves are known. Here, a hash operation is used in a general sense to indicate an output value being generated based on the input value. In some examples, the hash may be shorter (in bits) than the value from which it was derived, and the technique by which the hash is generated may apply a randomising or distributive effect on the distribution of the hash values (so that, for example, adjacent or similar input values do not necessarily end up as adjacent or similar output hash values). But a generalised function can be used, including examples such as truncating a version of the tag associated with the request (for example, using a number of least significant bits of the tag) and so on. In examples, the output of the hash function has a fixed (or predetermined) size (number of bits) whatever the size of the input value, although it will be appreciated that in a particular instance of at least some storage devices of the type discussed here, the size of the tag will also be the same from tag to tag.

Figure 3:
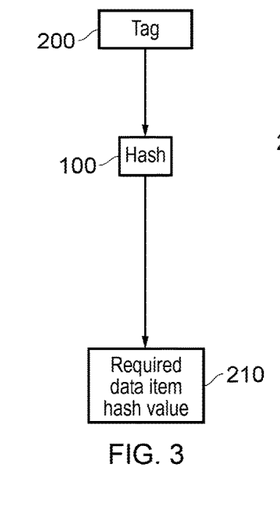
FIG. 3 schematically illustrates the generation of a data item hash value.
Figure 4:
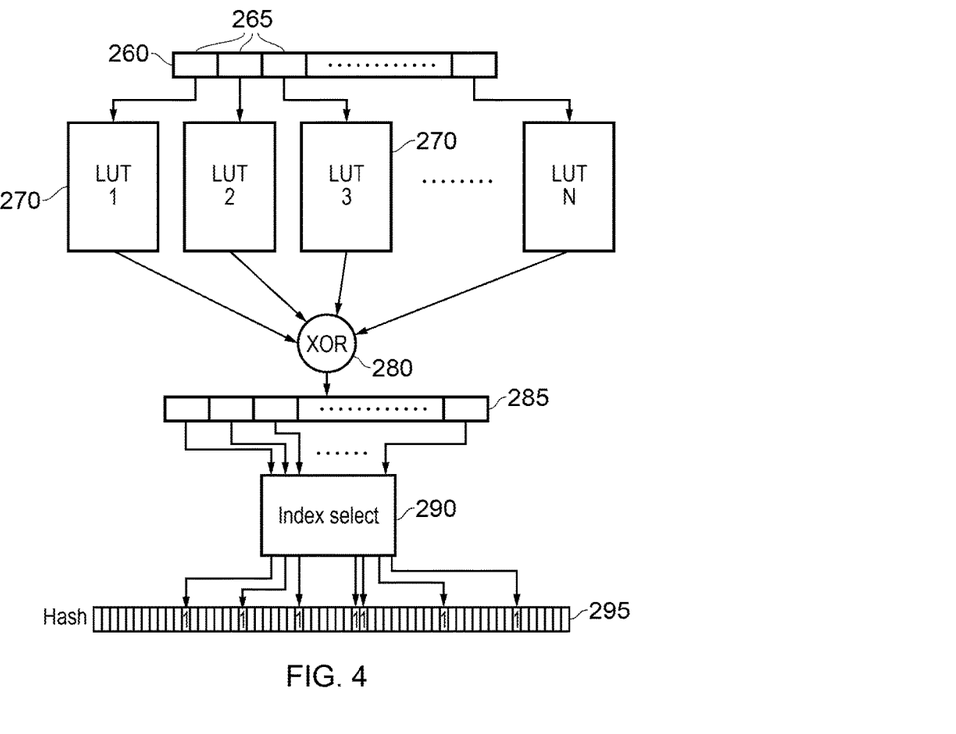
FIG. 4 schematically illustrates a hash value generator.

FIG. 3 schematically illustrates the generation of a hash value, in that a tag 200 associated with a request 40 is provided to the hash function 100 to generate a required data item hash value 210.

The required data item hash value 210 is provided to multiple Bloom filters (BF in FIG. 2) 110. Each Bloom filter 110 compares the required data item hash value with a partition hash value. The generation of a partition hash value is shown schematically in FIG. 5.

Figure 5:
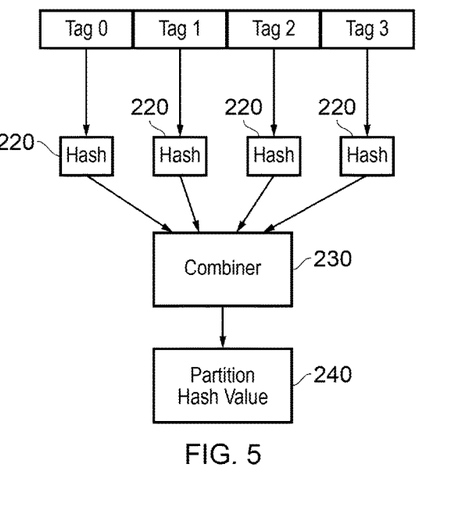
FIG. 5 schematically illustrates the generation of a partition hash value.

Referring to FIG. 5, for a particular partition, hash values are generated by respective hash value generators 220 from the tags associated with each of the data items stored by that partition. In the example shown in FIG. 5, four such tags are shown, but of course the actual number in each partition could be different in different systems. The four respective hash values, one for each tag, are combined by a combiner 230 to generate a partition hash value 240.

Figure 6:
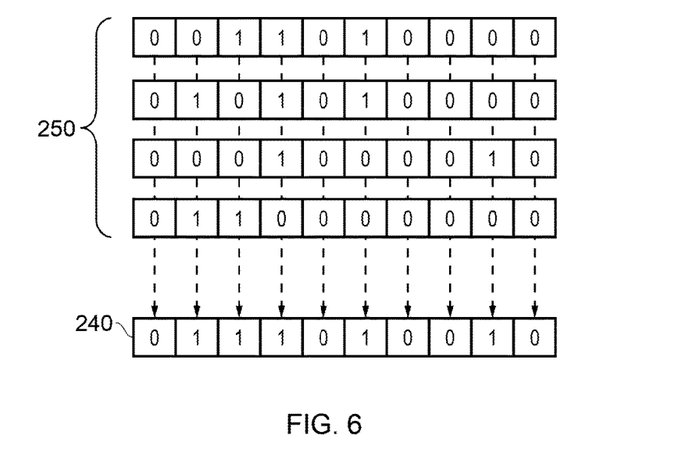
FIG. 6 schematically illustrates a combination of values.

The way in which the hash values are combined is shown schematically in FIG. 6, such that the partition hash value derived from the identifiers associated with the data storage elements of a partition comprises a logical combination of respective hash values (such as the outputs of the hash generators 220) derived from each of the identifiers or tags associated with the data storage elements of that partition.

In FIG. 6, the four example hash values 250 generated from the four example tags of the current partition are combined to generate the partition hash value 240 by examining each bit position in turn and applying a logical 1 to that bit position of the partition hash value 240 if any one or more of the hash values 250 has a logical 1 in that bit position. Note that the process is described in this way for clarity of the explanation; this does not imply that the process is necessarily a serial one, and indeed in the embodiments the operation may be a parallel process. This is an example of the logical combination applied by the combiner 230 being a combination such that when any bit position in any of the respective hash values (corresponding to the tags or identifiers of the partition) has a particular bit value (such as a logical 1), that bit position of the partition hash value is assigned the particular bit value. The example in FIG. 6 corresponds to an OR operation at each bit position.

Figure 7:
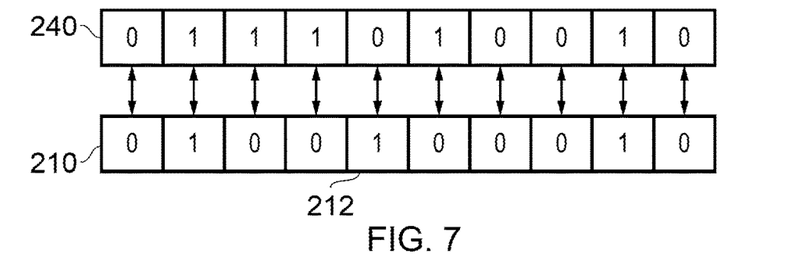
FIG. 7 schematically illustrates a comparison of values.
Figure 8:
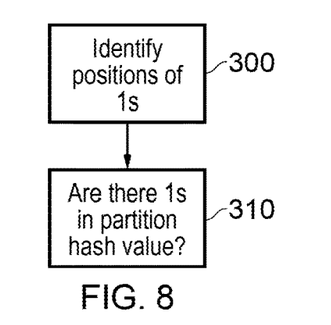
FIG. 8 is a schematic flowchart relating to a comparison of values.

The partition hash values are stored by the Bloom filters 110, thereby avoiding the need to regenerate them every time an access is requested to the cache memory 20. Each Bloom filter 110 corresponds to a respective partition, and compares the hash value 210 representing the required data item with the respective partition hash value 240 for that partition. FIGS. 7 and 8 schematically represent the comparison process. Referring to FIG. 7, the predictor (the Bloom filter 110) is configured to detect those bits of the required data item hash value which have a particular bit value (such as a logical 1 in this example) and to detect a match when corresponding bit positions of the partition hash value derived from the identifiers associated with the data storage elements of the respective partition under test have that particular bit value. So, in FIG. 7, the partition hash value 240 is shown along with an example of the required data item hash value 210. Looking at bit positions in the required data item hash value 210 which are set to logical 1, the Bloom filter 110 detects whether corresponding bit positions in the partition hash value are all populated with a logical 1. If they are all populated with logical 1s, then a possible match is detected, noting that this may be a true positive or may be a false positive match. But if any one or more bit positions of the partition hash value does not hold a 1 to match with a logical 1 in the required data item hash value, then a definite negative outcome is detected. The example of FIG. 7 illustrates one bit position 212 of the required data item hash value 210 for which the required data item hash value has a logical 1 but the partition hash value does not. The example of FIG. 7 therefore illustrates a definite negative outcome.

FIG. 8 is a schematic flow chart relating to such a comparison of values, in which, at a step 300 the positions of logical 1s in the required data item hash value 210 are detected, and, at a step 310, the Bloom filter identifies whether there are logical 1s in the partition hash value at all of those bit positions. If there are, then a potential positive outcome has been detected. If there are not, then a definite negative outcome has been detected.

It will of course be appreciated that the use of a logical 1 as the particular bit value is merely an example for the purposes of this discussion. Either polarity could be used for the particular bit, and indeed it would be possible to use multi-bit values.

Returning to FIG. 2, the set of Bloom filters 110, one for each partition, generates a set of respective outputs 120 indicative of possible partition hits by comparing a partition hash value derived from the identifiers associated with the data storage elements of that partition with a hash value derived from an identifier associated with the required data item. These are passed to a look up control/serialisation circuitry 130.

The circuitry 130 operates with respect to each of the possible partition hits in turn (that is to say, excluding the partitions identified by the Bloom filter as not holding the required item), to read the set of tags actually stored by the cache memory (in a tag SRAM 140) one partition at a time. SRAM can be used because—at least in a serialised comparator operation as discussed below—only those tags for cache lines in a single partition are required to be read out in any one clock cycle. These are compared by a comparator 150 with the tag associated with the request 40. The comparator is therefore configured to compare identifiers associated with data storage elements of one or more partitions in a test group of partitions with the identifier associated with the required data item, wherein any partitions in the subset of partitions are excluded from the test group of partitions.

If a match is detected by this comparison then this indicates a definitive match between the tag of the request 40 and a tag of a particular data storage element in that partition, and so a hit is detected, a "hit valid" output 160 is asserted by hit detection circuitry 165 and a signal is provided to a data SRAM 170 to cause the relevant data item to read from the appropriate location in the data SRAM and to be output as a data output 180. In response to a hit detection, the successive comparisons initiated by the look up control/serialisation circuitry 130 are terminated.

If, however, none of the comparisons carried out by the comparator 150 indicate that the tag of the current request corresponds to any of the stored tags for the partition under examination, then the look up control/serialisation circuitry 130 is controlled, via miss handling/hash regeneration circuitry 190 to carry out a similar test for the next one of the possible partition hits identified by the signals 120. The selection of a next partition from the potential hits can be carried out in an arbitrary, predetermined or pseudo random order. Once again, the tags corresponding to that next partition are read from the tag SRAM 140 and supplied to the comparator 150. The process continues until either a hit has been detected or all of the possible partitions identified by signals 120 have been tested. Accordingly, the comparator 150 is configured to compare identifiers associated with each of the test group of partitions in turn with the identifier associated with the required data item (of the request 40), until either all of the partitions' identifiers in the test group of partitions have been compared or a match has been detected between an identifier associated with a data storage element of one of the partitions in the test group of partitions and the identifier associated with the required data item. This is an example of comparing identifiers associated with data storage elements of one or more partitions in a test group of partitions with the identifier associated with the required data item, wherein any partitions in the subset of partitions are excluded from the test group of partitions. This is continued until either all of those partitions' identifiers have been compared or a match has been detected between an identifier associated with a data storage element of one of the tested partitions and the identifier associated with the required data item.

Figure 9:
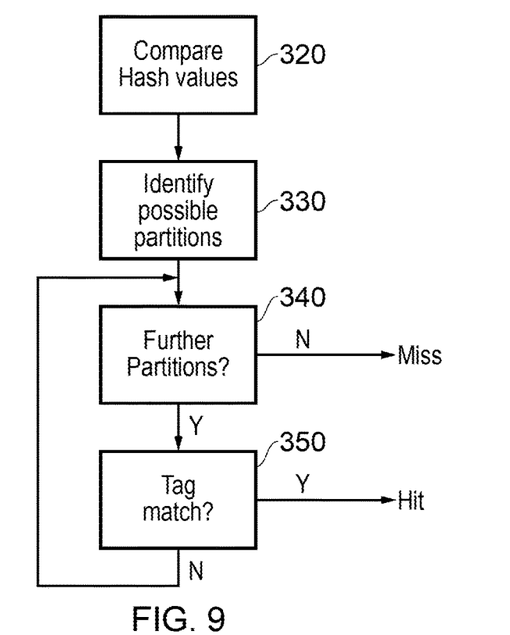
FIG. 9 is a schematic flowchart relating to a data item request.

FIG. 9 schematically illustrates this process. At a step 320, the hash value 210 is compared with each of the partition hash values held by the Bloom filters 110 in order, at a step 330, to identify possible partitions (or in other words, to identify a subset of partitions which do not store the item, so that the subset can be excluded from a comparison process). Control then passes to a step 340 at which it is detected whether there are any further partitions to be tested by the comparator.

Note that the outcome of the step 330 can be zero or more partitions, so the first operation of the step 340 might produce a negative result indicating a cache miss. However, assuming there is at least one partition of the identified group still to be tested by the comparator 150, control passes to a step 350 at which the tags of those data items held in that partition are read from the tag SRAM 140 and are compared, by the comparator 150, with the tag of the request. If a match is found then a hit is indicated and the process terminates. If not, control passes back to the step 340 to detect whether there are any further remaining partitions to be tested.

The step 340 allows for multiple iterations of the step 350, but in many real instances of operation, the number of iterations may be as low as one. This is because in some example embodiments using (say) 512 cache lines organised as 128 partitions of 4 lines and a 22 bit hash, the rate at which false positive detections are generated may be quite low, for example 1% (so one in one hundred detections are false positive). In turn, this means that the number of instances where two or more partitions may need to be tested is very low. Given that even when more than one candidate partition is detected, there is a chance that the first-tested partition turns out to be the correct one, the number of instances of multiple iterations of the step 350 can be lower still. This allows the present arrangements to be used with potentially very little adverse effect on performance, as in most cases even though the Bloom filter does not offer a definitively positive outcome, it may tend to be the correct outcome anyway.

In some examples, the number of bits m of the hash value for each cache line of a cache with L lines, for a desired false positive rate P (for example, 0.01) and X partitions may be given by:

$$m = \frac{X}{L} \left\lceil -\frac{L\ln(1 - \sqrt[X]{1-P})}{X(\ln 2)^2} \right\rceil$$

(rounded up to the nearest bit)

Figure 10:
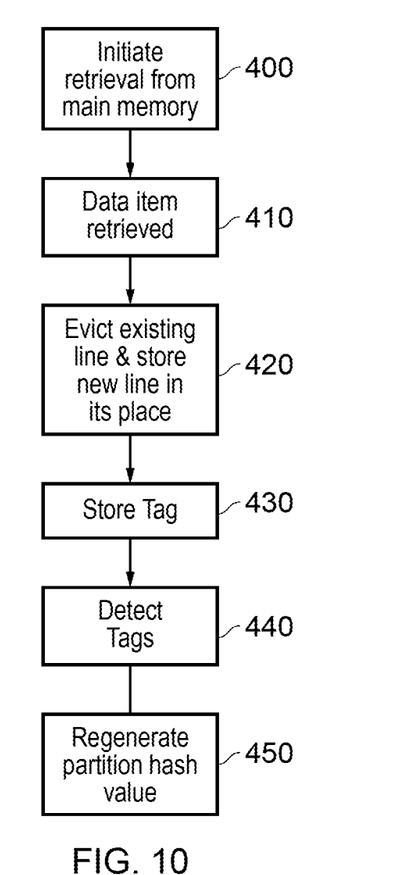
FIG. 10 is a schematic flowchart illustrating a miss handling process.

Here, the large square brackets represent the ceiling function, or in other words a rounding up of the contents of the square brackets to the nearest integer. A miss (the negative outcome of the step 340 of FIG. 9) is handled by the miss handling/hash regeneration circuitry 190. As discussed, a miss represents a failure of any of the zero or more possible partitions identified by the signals 120 to have a match between the respective tags and the tag of the request 40. FIG. 10 is a schematic flow chart illustrating a miss handling process.

At a step 400, the miss handling/hash regeneration circuitry 190 initiates a retrieval of the required data item from a main memory or other level of cache hierarchy such as the main memory or other level of cache hierarchy 30 of FIG. 1. The data item has been retrieved at this step 410, in response to which the miss handling/hash regeneration circuitry 190 initiates the eviction of an existing cache line and the storage of the newly retrieved line in its place. At a step 430 the tag corresponding to the newly retrieved line is stored at the appropriate location in the tag SRAM 140.

The miss handling/hash regeneration circuitry 190 then carries out a regeneration process. In examples, this process operates only in respect of the particular Bloom filter 110 corresponding to the partition in which the newly retrieved cache line has been stored. None of the other Bloom filters require any such regeneration process.

At the regeneration process, the miss handling/hash regeneration circuitry 190 detects the tags associated with that partition, including the newly stored tag at the step 430, and regenerates the partition hash value at a step 450 by a repeat of the process schematically illustrated in FIG. 5 and described above. The miss handling/hash regeneration circuitry 190 causes the storage of the regenerated partition hash value in place of the previous partition hash value at that Bloom filter 110. The miss handling/hash regeneration circuitry 190 therefore provides an example of control logic, responsive to a change in the data items stored by the data storage elements of a partition, to generate replacement information (such as a partition hash value) derived from the identifiers or tags associated with the data storage elements of that partition, for storage by the predictor or Bloom filters.

The miss handling/hash regeneration circuitry 190, operating in accordance with the step 400, provides an example of control logic configured to obtain a required data item from a main memory or other level of cache hierarchy (such as the main memory or other level of cache hierarchy 30) and to store that data item in one of the data storage elements (for example, of the data SRAM 170) in response to a detection by the comparator 150 that none of the identifiers associated with partitions detected by the predictor match the identifier associated with the required data item.

The above examples have been described with reference to reading data from a cache, but the same principles could also apply to accessing a cache line or other data storage element in a fully associative or other arrangement in order to write to that element.

It will be appreciated that the Bloom filter as described above represents just one way in which the present embodiments could be implemented. Indeed, the term "Bloom filter" encompasses a variety of techniques by which the predictor could operate. At a general level, as discussed above, the predictor is configured to detect which of the partitions may be currently storing a required data item. For example, the predictor could give a "possibly positive" answer for some partitions along with a "definitely negative" answer for other partitions. An aim of some example embodiments is to narrow down (or reduce) the number of partitions which have to be searched for a definite match by the comparator. The predictor can achieve this in a number of different ways, each based upon comparing, for each partition, information derived from the identifiers associated with the data storage elements of that partition with information derived from an identifier associated with the required data item, to identify a subset of partitions that do not store the required data item. The comparator can act serially or in parallel in the case that more than one candidate (possible positive match) partition is identified by the predictor, but in example embodiments it is configured to act serially, which in turn allows the tags to be stored in a memory such as an SRAM.

As discussed above, a generic hash function can be used. In example embodiments, however, some features of the hash function can be useful. One feature is to consider the number of bits of the hash function as discussed above, in order to obtain a balance between a desired false positive rate and storage required for the has values. Another feature is a randomising effect of the hash function. In at least some example applications, fully random accesses to the data storage device are not expected, so it can be useful to attempt to disrupt the correlation between neighbouring addresses (neighbouring tags) and the corresponding hash values. For example, pseudo-random functions can be used, or look-up tables of random or pseudo-random values can be used by the hash generation functions. Such tables could be indexed by portions of the tag value and the indexed portions then combined. For example, with reference to FIG. 4, the tag value 260 to be hashed could be split (as sub-groups of adjacent bits, for example) into N portions 265, and each portion uses as an index into a q-bit look-up table (LUT) 270 of random numbers. Each portion therefore generates an q-bit value, and the m-bit values are then combined by an exclusive OR (XOR) function 280 into a combined q-bit value 285. From this q-bit value, bits at particular bit positions are selected by an index selector 290 and used to populate corresponding positions of the hash value 295.

A further aspect of the hash values is the question of how many bits of the partition hash value a single hash value is allowed (on average) to set. If the individual hash values tend on average to set too many bits of the partition hash value, the partition hash value may tend to saturate and there will be an excess of false positives. If however the individual hash values tend on average to set too few of the bits of the partition hash value, more of the hash values will tend to the same bit pattern and once again more false positives may be generated. A balance between these extremes can be provided by an example number k of the m bits being set, at least on average, by the hash function:

$$k = m\ln 2 = -\frac{\ln\left(1 - \sqrt[X]{1-P}\right)}{\ln 2}$$

Taking rounding into account, this can be expressed as:

$$k = \left\lceil \frac{X\ln 2}{L} \left\lceil -\frac{L\ln\left(1 - \sqrt[X]{1-P}\right)}{X(\ln 2)^2} \right\rceil \right\rceil$$

Example embodiments can provide storage device such as a fully associative storage device with power and circuit area size advantages over a previously proposed fully associative storage device using flip-flops to hold tags (which in turn are required in the previously proposed example because of the need in such devices to compare all of the stored tags simultaneously). These advantages can become particularly apparent as the tag size increases. In a previously proposed device, the number of flip-flops would increase with the tag size. But in the present embodiments, by using a hash function (in the generic form discussed above), the number of flip-flops or other similar storage required for implementation of the Bloom filters or similar arrangements can remain substantially the same whatever the tag size. Even taking into account the circuitry required if a regeneration function is implemented, this can provide both circuit area and power consumption reduction compared to the previously proposed devices.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A data storage device comprising:
an array of data storage elements arranged as multiple partitions each comprising two or more data storage elements, each data storage element being associated with a respective identifier which identifies a data item currently stored by that data storage element;
a predictor configured to compare, for each partition, a partition hash value derived from the identifiers associated with the data storage elements of that partition with a hash value derived from an identifier associated with a required data item, to identify a subset of partitions that do not store the required data item; and
a comparator configured to compare identifiers associated with data storage elements of one or more partitions in a test group of partitions with the identifier associated with the required data item, wherein any partitions in the subset of partitions are excluded from the test group of partitions,
wherein the partition hash value derived from the identifiers associated with the data storage elements of a partition comprises a logical combination of respective hash values derived from each of the identifiers associated with the data storage elements of that partition.

2. A device according to claim 1, in which the comparator is configured to compare identifiers associated with each of the test group of partitions in turn with the identifier associated with the required data item, until either all of the partitions' identifiers in the test group of partitions have been compared or a match has been detected between an identifier associated with a data storage element of one of the partitions in the test group of partitions and the identifier associated with the required data item.

3. A device according to claim 1, in which:
the predictor is configured to detect those bits of the hash value derived from the required data item which have a particular bit value and to detect a match when corresponding bit positions of the partition hash value derived from the identifiers associated with the data storage elements of a partition under test have that particular bit value; and
the logical combination of the respective hash values is a combination such that when any bit position in any of the respective hash values has the particular bit value, that bit position of the partition hash value is assigned the particular bit value.

4. A device according to claim 1, in which the predictor is configured to store the information derived from the identifiers associated with the data storage elements of each partition.

5. A device according to claim 4, comprising control logic, responsive to a change in the data items stored by the data storage elements of a partition, to generate replacement information derived from the identifiers associated with the data storage elements of that partition, for storage by the predictor.

6. A device according to claim 1, in which:
the data storage device is a cache memory; and
the identifier associated with a data item is a tag comprising a portion of that data item's memory address.

7. A device according to claim 6, in which:
each data storage element comprises a group of data storage locations configured to store multiple data items having a most significant portion of their memory addresses in common; and
the tag comprises at least a part of the most significant portion of the memory addresses.

8. A device according to claim 6, comprising control logic configured to obtain a required data item from a main memory or other level of cache hierarchy and to store that data item in one of the data storage elements in response to a detection by the comparator that none of the identifiers associated with partitions detected by the predictor match the identifier associated with the required data item.

9. A device according to claim 1, in which the array of data storage elements is fully associative such that any data item can be stored by any of the data storage elements.

10. A data storage device comprising:
means for storing data as an array of data storage elements arranged as multiple partitions each comprising two or more data storage elements, each data storage element being associated with a respective identifier which identifies a data item currently stored by that data storage element;
means for comparing, for each partition, a partition hash value derived from the identifiers associated with the data storage elements of that partition with a hash value derived from an identifier associated with a required data item, to identify a subset of partitions that do not store the required data item; and
means for comparing identifiers associated with data storage elements of one or more partitions in a test group of partitions with the identifier associated with the required data item, wherein any partitions in the subset of partitions are excluded from the test group of partitions,
wherein the partition hash value derived from the identifiers associated with the data storage elements of a partition comprises a logical combination of respective hash values derived from each of the identifiers associated with the data storage elements of that partition.

11. A data storage method comprising:
storing data as an array of data storage elements arranged as multiple partitions each comprising two or more data storage elements, each data storage element being associated with a respective identifier which identifies a data item currently stored by that data storage element;
comparing, for each partition, a partition hash value derived from the identifiers associated with the data storage elements of that partition with a hash value derived from an identifier associated with a required data item, to identify a subset of partitions that do not store the required data item; and
comparing identifiers associated with data storage elements of one or more partitions in a test group of partitions with the identifier associated with the required data item, wherein any partitions in the subset of partitions are excluded from the test group of partitions,
wherein the partition hash value derived from the identifiers associated with the data storage elements of a partition comprises a logical combination of respective hash values derived from each of the identifiers associated with the data storage elements of that partition.

* * * * *